T. PRENTICE.
RULE JOINT.
APPLICATION FILED JUNE 6, 1907.
909,819.
Patented Jan. 12, 1909.
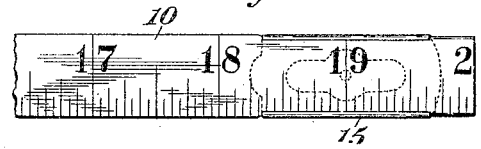
Fig. 1.
Fig. 2.
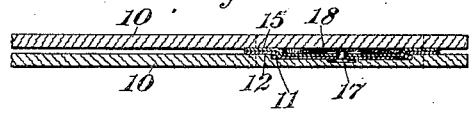
Fig. 3.
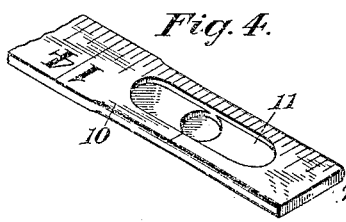
Fig. 4.
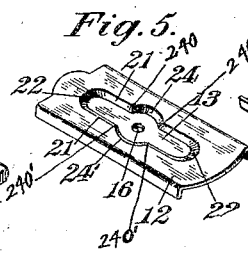
Fig. 5.
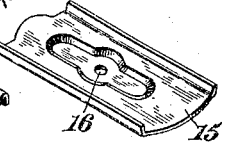
Fig. 6.
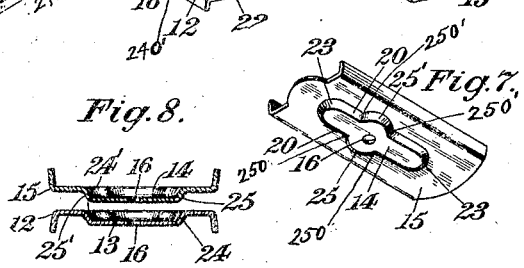
Fig. 7.
Fig. 8.
Witnesses:
J. L. Edwards.
H. D. Penney
Inventor:
Thomas Prentice.
By his Attorney,
F. H. Richards.

UNITED STATES PATENT OFFICE.

THOMAS PRENTICE, OF NEW BRITAIN, CONNECTICUT, ASSIGNOR TO THE PRENTICE MANUFACTURING COMPANY, OF MIDDLETOWN, CONNECTICUT, A CORPORATION OF CONNECTICUT.

RULE-JOINT.

No. 909,819.  Specification of Letters Patent.  Patented Jan. 12, 1909.

Application filed June 6, 1907. Serial No. 377,547.

*To all whom it may concern:*

Be it known that I, THOMAS PRENTICE, a citizen of the United States, residing in New Britain, in the county of Hartford and State of Connecticut, have invented certain new and useful Improvements in Rule-Joints, of which the following is a specification.

This invention relates to rule joints, and has for an object to provide means for pivotally joining together the sections of a rule in such a manner that longitudinal movement of the sections one relative to the other will be prevented, for relieving the pivotal rivet holding the locking plates together from strain and the rivet holes from enlargement due to the strain and wear.

In the use of rules, more particularly those which embody a number of thin sections which fold up flatwise one upon the other, it has been found that the present method of pivoting the sections together permits a certain amount of longitudinal movement of the sections one relative to the other when these are extended, which movement prevents accuracy in measurement, and the movement also when the sections are closed together prevents the members of the pile of sections from having a firm relation. The present improvement, however, provides means for taking the strain in a direction longitudinally of the rule sections, off of the pivotal rivet and placing this upon faces which will receive such strain.

In the drawings accompanying and forming a part of this specification, Figure 1 is a top view of a portion of a rule equipped with my present improvement. Fig. 2 is an edge view of a rule embodying two sections fastened together by my present improvement. Fig. 3 is a longitudinal section of the device shown in Fig. 2. Fig. 4 is a perspective view of the end of a rule prepared to receive my improved rule joint. Fig. 5 is a perspective view of one of the plates going to make up the joint. Fig. 6 is a perspective view of a plate for mating with the plate shown in Fig. 5. Figs. 5 and 6 show the plates in the relation in which they will be assembled. Fig. 7 is a view of the other side of the plate shown in Fig. 6; and Fig. 8 is a cross section of the plates, shown superposed but not assembled.

As was stated in the introduction to this specification the present improvement is more particularly designed for use upon those rules which are made up of a number of thin sections which fold together flatwise. In the present drawings a number of such sections 10 are illustrated. For the purpose of preventing the portions of the device constituting the joint from taking up too much room the sides of the rule adjacent the ends may be recessed as at 11. The plate 12 shown in Fig. 5 has a depression 13 for receiving the protruding portion 14 of the plate 15 illustrated in Figs. 6 and 7. These mating locking portions 13 and 14 are disposed longitudinally of the sections. The plates are provided with holes 16 for receiving a pivotal rivet 17, which rivet may be provided with a spring plate 18 for permitting it to yield when the parts are turned, since it will be apparent that the protruding portion 14 will be drawn into the cavity 13 when the two sections carrying the plates 12 and 15 are turned so that the sections are longitudinally disposed one relative to the other. Upon turning the sections out of this position the faces 20 of the protruding portion 14 will ride up the faces 21 of the cavity 13 and the flexibility of the plates and of the spring 18 will be called into play for permitting this movement.

On this class of rules heretofore the longitudinal strain upon the rule sections when these have been folded up into parallelism or when extended longitudinally has been borne by the rivet which constituted the pivot. The plates carried by the rule sections are usually made of thin sheet metal, and a hole is punched through each plate, and the plates will be fastened together by a rivet. The rivet is small and it will wear back the edges of the plate at the rivet hole; and the plates being thin and sharp at the edges of the rivet hole will cut the rivet.

In my present improvement one of the plates is provided, as was before stated, with the protrusion 14 and the other is provided with the cavity or socket 13. These are shown in the socket member two pairs of corners 240—240 and 240'—240' projecting, as it were, into the socket. Between the corners of the respective pairs are the bearing faces 24 and 24', which faces are segmental, having as a common center the center of the rivet or its hole 16. The protruding member has two pairs of corners 250—250 and 250'—250' indented, as it were, into it. Between the corners of the respective pairs are the bearing faces 25 and 25', which faces are segmental and will fit inside of the faces 24—24', the faces 25—25' having as a common center the center of the rivet or the rivet hole. The faces 24—24' and 25—25' are correspondingly slanting. The faces 25—25' of the protruding member constitute the pivot or pintle for seating in the faces 24—24' about which the turning of the rule sections will take place during the later states of bringing the sections into parallelism and into longitudinal relation, and will during such times relieve the rivet entirely of its functions as pivot or pintle.

Instead of the small surface of the rivet being relied upon for maintaining the alinement a pintle many times larger in diameter will be called into play. The sharp edge of the thin sheet metal, the thickness of the plate, is presented to the rivet; but here the much wider faces 24—24' and 25—25' come together, thus preventing the cutting of the rivet and the wearing away of the edge of the plate at the rivet above referred to. Even if such wearing away of the plate and of the rivet does take place at the times when it is desired to have accuracy, namely when the rule sections are extended and when they are folded together, the faces above referred to, of this large pintle, will come into engagement and be effective in holding the sections in proper relation one to the others. The corners 240—240 and 240'—240' enter the indentations 250—250 and 250'—250' when the rule sections are alined and when they are brought into parallelism. The engagement of these corners with the recesses securely hold the sections not only against relative longitudinal movement, but also against angular movement about the pivot. The form of plates herein described, having the corners fitting into the recesses, presents such a structure that when the parts are made interchangeable, as they will be in practice, great accuracy will result and these corners will coöperate with the segmental faces in taking the strain off of the rivet and the plate at the rivet hole.

Having described my invention I claim:

1. The combination with a pair of rule sections, of plates carried by the sections, one plate having a cavity formed in it and the corners extending into the cavity, the other plate having a protrusion for entering the cavity, and such protrusion having recesses for receiving the said corners, and a rivet connecting said plates and disposed in such plates centrally of the corners and recesses respectively.

2. The combination with a pair of rule sections, of plates carried by the sections, one plate having a cavity formed in it and the other plate having a protrusion for entering the cavity, said protrusion having two segmental bearing faces having the same center, and recesses at the ends of the said faces, and said cavity having two mating segmental faces, and corners at the ends of the said faces for entering the said recesses, and a pivotal connection for said plates axially coincident with the center of said segmental bearing faces, the said faces, the corners and recesses being constructed and adapted for interengagement upon the rule sections being extended longitudinally and being folded together.

3. A rule embodying sections, a rivet for pivoting one section to another, and an enlarged segmental pintle surrounding the rivet for taking the working strain off of the rivet when the sections are longitudinally extended and when folded up in parallelism, and means for unseating the segmental pintle upon angular movement of one section relative to the other.

THOMAS PRENTICE.

Witnesses:
WILLIAM F. DELANEY,
J. C. LINCOLN.